(12) United States Patent
Son et al.

(10) Patent No.: US 12,538,129 B2
(45) Date of Patent: Jan. 27, 2026

(54) WIRELESS INTRUSION PREVENTION SYSTEM USING OUI AND MAC

(71) Applicant: SECUI CORPORATION, Seoul (KR)

(72) Inventors: Min Ki Son, Seoul (KR); Seok Ju Kang, Gyeonggi-do (KR)

(73) Assignee: SECUI CORPORATION, Seoul (KR)

( * ) Notice: Subject to any disclaimer, the term of this patent is extended or adjusted under 35 U.S.C. 154(b) by 42 days.

(21) Appl. No.: 18/563,875

(22) PCT Filed: Apr. 5, 2022

(86) PCT No.: PCT/KR2022/004892
§ 371 (c)(1),
(2) Date: Nov. 23, 2023

(87) PCT Pub. No.: WO2022/255619
PCT Pub. Date: Dec. 8, 2022

(65) Prior Publication Data
US 2024/0373228 A1 Nov. 7, 2024

(30) Foreign Application Priority Data
Jun. 2, 2021 (KR) .................. 10-2021-0071809

(51) Int. Cl.
*H04L 29/06* (2006.01)
*H04W 12/122* (2021.01)
*H04W 84/12* (2009.01)

(52) U.S. Cl.
CPC .......... *H04W 12/122* (2021.01); *H04W 84/12* (2013.01)

(58) Field of Classification Search
CPC .................................................. H04W 12/122
(Continued)

(56) References Cited

U.S. PATENT DOCUMENTS 9,948,354 B2 * 4/2018 Bennett .................... H04B 3/52
9,954,287 B2 * 4/2018 Henry ..................... H01Q 21/00
(Continued)

FOREIGN PATENT DOCUMENTS

CN 105592040 A * 5/2016 ......... H04L 63/0428
CN 106658586 A * 5/2017 ......... H04L 61/6022
(Continued)

OTHER PUBLICATIONS

@TASSAN703, How can randomized MAC addresses be handled in network authentication? Cisco ISE Use Cases, Qiita, Dec. 16, 2020, Retrieved from Internet: <https://qiita.com/tassan703/items/06678e389a4b5be47d11>.
(Continued)

*Primary Examiner* — Haresh N Patel
(74) *Attorney, Agent, or Firm* — IP & T GROUP LLP (57) ABSTRACT

The present disclosure relates to an electronic device, and a wireless intrusion prevention system according to the present disclosure may include a sensing device and a controller. The sensing device may be configured to monitor a wireless frame transmitted/received between an access point (AP) and a plurality of stations over a wireless network and generate frame analysis information based on the wireless frame. The controller may be configured to compare manufacturer identification information including Organizationally Unique Identifiers (OUIs) with Media Access Control (MAC) addresses of respective stations included in the frame analysis information, determine a target station having a random MAC address among the plurality of stations based on a result of the comparison, and control access to the access point by the target station based on a blocking policy.

15 Claims, 7 Drawing Sheets

(58) Field of Classification Search
 USPC ............................................................ 726/23
 See application file for complete search history.

(56) References Cited

U.S. PATENT DOCUMENTS

| | | | | |
|---|---|---|---|---|
| 9,967,173 | B2 * | 5/2018 | Gross ..................... | H04B 3/52 |
| 9,973,940 | B1 * | 5/2018 | Rappaport ............... | H04B 3/46 |
| 9,979,550 | B1 * | 5/2018 | Fiedler .................. | H04L 9/3247 |
| 9,991,580 | B2 * | 6/2018 | Henry .................... | H01P 5/188 |
| 9,997,819 | B2 * | 6/2018 | Bennett .................. | H01P 3/122 |
| 10,057,813 | B1 * | 8/2018 | Likar .................... | H04L 63/0846 |
| 2016/0105809 | A1 * | 4/2016 | Chou .................. | H04L 41/0686 |
| | | | | 370/216 |
| 2016/0135053 | A1 | 5/2016 | Lee et al. | |
| 2016/0143028 | A1 * | 5/2016 | Mancuso .............. | H04W 12/00 |
| | | | | 370/338 |
| 2021/0036988 | A1 | 2/2021 | McKibben et al. | |

FOREIGN PATENT DOCUMENTS

| | | | | |
|---|---|---|---|---|
| CN | 103929376 B | * | 6/2017 | |
| CN | 111368595 A | * | 7/2020 | |
| CN | 111372278 A | * | 7/2020 | ............ H04W 24/08 |
| CN | 112202610 A | * | 1/2021 | ......... G06F 16/2455 |
| EP | 3284280 B1 | * | 7/2019 | ............ H04W 12/08 |
| JP | 2016174304 A | * | 9/2016 | |
| KR | 20120132086 A | * | 12/2012 | |
| KR | 10-2017-0062301 A | | 6/2017 | |
| KR | 20170062301 A | * | 6/2017 | |
| KR | 20190033757 A | * | 4/2019 | |
| KR | 10-2157661 B1 | | 9/2020 | |
| KR | 10-2021-0015088 A | | 2/2021 | |
| KR | 10-2359801 B1 | | 2/2022 | |
| TW | I728901 B | * | 6/2021 | |

OTHER PUBLICATIONS

Office Action for Japanese Patent Application No. 2023-574116 issued by the Japanese Patent Office on Oct. 21, 2025.

* cited by examiner

WIRELESS INTRUSION PREVENTION SYSTEM USING OUI AND MAC

CROSS-REFERENCE TO RELATED APPLICATION

This application is a national stage application of PCT/KR2022/004892 filed on Apr. 5, 2022, which claims priority of Korean patent application number 10-2021-0071809 filed on Jun. 2, 2021. The disclosure of each of the foregoing applications is incorporated herein by reference in its entirety.

TECHNICAL FIELD

The present disclosure relates to a wireless intrusion prevention system and a method of operating the wireless intrusion prevention system.

BACKGROUND ART

With the rapid development and propagation of the Internet, network environments have expanded, and the form of the Internet has become more complicated due to easy and convenient network access to the Internet and various types of services provided via the Internet. However, due to various types of network attacks, such as viruses, hacking, system intrusion, acquisition of system administrator privileges, concealment of intrusion, and denial of service attacks performed over the Internet, the Internet is always exposed to the risk of hacking, thus increasing the Internet infringements, gradually increasing the scale of damage to public institutions, social infrastructure, and financial institutions, and also increasing the influence thereof. In order to solve such Internet security problems, the need for network security technology, such as antivirus programs, firewalls, integrated security management, and intrusion detection systems, has come to the fore.

A wireless network system for wireless Internet communication includes a wireless Local Area Network (LAN) Access Point (AP) and a wireless LAN station. An AP is used by installing a piece of equipment called an access point device.

Recently, an integrated network system using wired and wireless networks has been widely developed and applied. It is difficult to reliably block harmful traffic arriving in a wired manner, but it is more difficult to reliably block harmful traffic arriving in a wireless manner. In order to solve this, a Wireless Intrusion Prevention System (WIPS) is under continual development. The WIPS is a system which detects and blocks a wireless intrusion, such as an unauthorized (rogue) AP or a Denial of Service (DOS) attack, through wireless section monitoring.

DISCLOSURE

Technical Problem

Various embodiments of the present disclosure are directed to a wireless intrusion prevention system and a method of operating the wireless intrusion prevention system, which block access by a station having a random MAC address based on blocking policies when the station having the random MAC address accesses an Access Point (AP) over a wireless network to which, for example, IEEE 802.11 technology or IEEE 802.11w technology is applied.

Technical Solution

A wireless intrusion prevention system according to an embodiment of the present disclosure may include a sensing device and a controller. The sensing device may be configured to monitor a wireless frame transmitted/received between an access point (AP) and a plurality of stations over a wireless network and generate frame analysis information based on the wireless frame. The controller may be configured to compare manufacturer identification information including Organizationally Unique Identifiers (OUIs) with Media Access Control (MAC) addresses of respective stations included in the frame analysis information, determine a target station having a random MAC address among the plurality of stations based on a result of the comparison, and control access to the access point by the target station based on a blocking policy.

A method of operating a wireless intrusion prevention system according to an embodiment of the present disclosure may include receiving a request to access an access point from a target station among a plurality of stations that transmit/receive a wireless frame to/from an access point over a wireless network; determining whether a Media Access Control (MAC) address of the target station included in the wireless frame is a random MAC address or a unique MAC address, based on a result of a comparison between manufacturer identification information including Organizationally Unique Identifiers (OUIs) and the MAC address of the target station; and controlling access to the access point by the target station depending on whether the MAC address of the target station is the random MAC address.

Advantageous Effects

According to embodiments of the present disclosure, when a station is associated with an AP through, for example, IEEE 802.11, the association with the AP may be released and access to the AP may be blocked depending on whether the MAC address of the station is a random MAC address.

MODE FOR INVENTION

Specific structural or functional descriptions in the embodiments of the present disclosure introduced in this specification or application are provided as examples to describe embodiments according to the concept of the present disclosure. The embodiments according to the concept of the present disclosure may be practiced in various forms, and should not be construed as being limited to the embodiments described in the specification or application.

Figure 1:
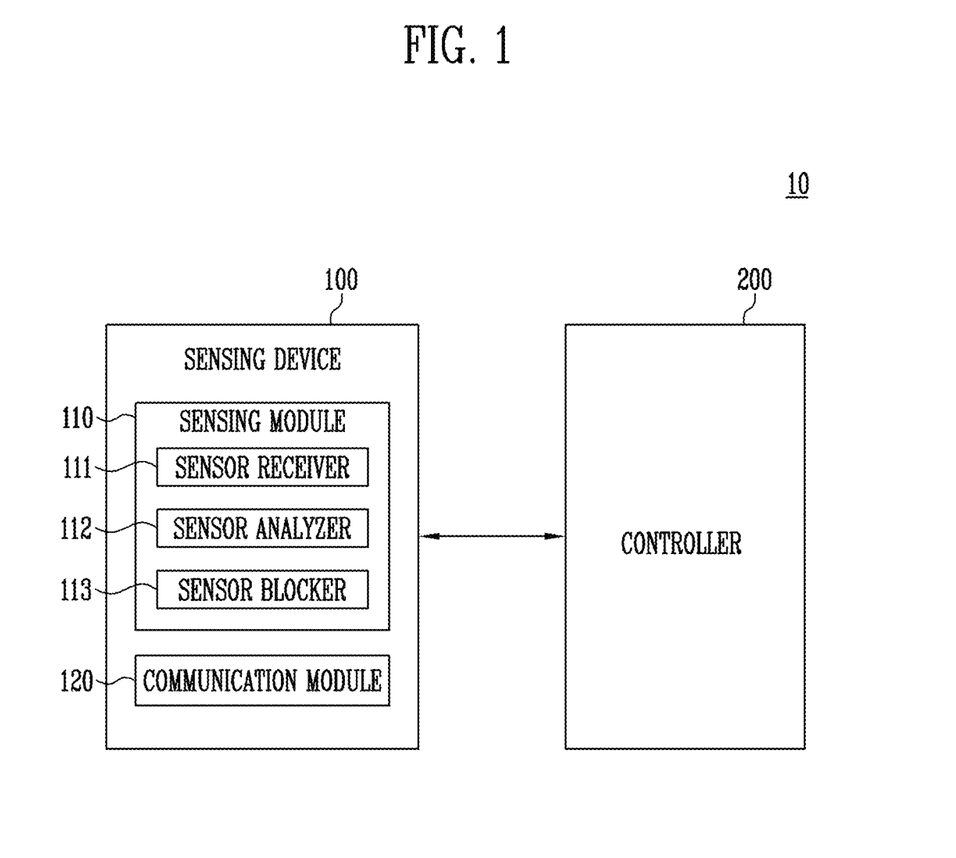
FIG. 1 is a block diagram illustrating the configuration of a wireless intrusion prevention system.

FIG. 1 is a block diagram illustrating the configuration of a wireless intrusion prevention system.

Referring to FIG. 1, a Wireless Intrusion Prevention System (hereinafter referred to as WIPS) is a system for detecting and blocking a wireless intrusion such as a rogue Access Point (AP) or a Denial of Service (DOS) attack through wireless section monitoring.

A normal wireless network, described in the present specification, may include a wireless network to which IEEE 802.11 or IEEE 802.11w is applied. IEEE 802.11w is amended technology of IEEE 802.11 for improving the security of management frames. However, the present disclosure is not limited thereto, and it will be apparent that embodiments of the present disclosure may be applied to a wireless network to which various security technologies are applied.

The wireless network system includes one or more Basic Service Sets (BSS), each of which refers to a set of devices that are successfully synchronized with each other to be capable of communicating with each other. Generally, BSS may be divided into an infrastructure BSS and an Independent BSS (IBSS).

An Access Point (hereinafter referred to as AP) is an entity which provides access to a distribution system via a wireless medium for stations associated therewith. An AP is used as a concept including a Personal BSS Coordination Point (PCP), and may include, in a broad sense, all of concepts of a centralized controller, a base station (BS), a node-B, a Base Transceiver System (BTS), or a site controller. In the present disclosure, an AP may be designated as a base wireless communication station, and the base wireless communication station may be used, in a broad sense, as the term including all of an AP, a base station, an eNodeB (eNB), and a transmission point (TP). In addition, the base wireless communication station may include various types of wireless communication stations which allocate communication medium resources and perform scheduling in communication with a plurality of wireless communication stations.

A station may be any device including media access control (MAC) complying with the specification of an IEEE 802.11 standard and a physical layer interface for wireless media, and may include, in a broad sense, an access point (AP) as well as a non-access point (non-AP) station. In the present specification, 'station' refers to a non-AP station, but may be used as the term referring both to a non-AP station and to an AP in accordance with an embodiment. The station for wireless communication may further include a processor and a transmitter/receiver, and may further include a user interface unit, a display unit, etc. according to an embodiment. The processor may generate a frame to be transmitted over a wireless network or process a frame received over the wireless network, and may additionally perform various types of processing for controlling the station. Also, the transmitter/receiver may be functionally coupled to the processor, and may transmit/receive, for the station, frames over the wireless network. The station may transmit/receive a frame to/from the AP over the wireless network.

In an embodiment, a WIPS 10 may compare manufacturer identification information including Organizationally Unique Identifiers (OUIs) with Media Access Control (MAC) addresses of respective stations included in a wireless frame. The WIPS 10 may determine a target station having a random MAC address among a plurality of stations, based on the result of the comparison, and may control access by the target station to the access point based on a blocking policy.

In an embodiment, the blocking policy may be a policy which blocks access to the access point by the target station having a random MAC address and which allows access to the access point by a station having a unique MAC address among the plurality of stations. The reason for this is to prevent intrusion into the wireless network by blocking access by a station having a random MAC address by which a user cannot be specified.

In an embodiment, the blocking policy may be a policy which blocks access to the access point by a target station having a random MAC address, and which blocks access to the access point by a station having a non-registered MAC address and allows access to the access point by a station having a registered MAC address, among stations having unique MAC addresses. The reason for this is to allow access only by an access-authorized station among stations having unique MAC addresses by which users can be specified, thus preventing intrusion into the wireless network. The registered MAC address may be the MAC address of a station pre-registered by an administrator.

In an embodiment, the blocking policy may be a policy which blocks access to the access point by a station unapproved by the administrator and which allows access to the access point by a station approved by the administrator, among target stations having random MAC addresses. This is intended to exceptionally allow access in the case where previous approval is acquired from the administrator even though a station has a random MAC address by which a user cannot be specified.

In an embodiment, the WIPS 10 may include a sensing device 100 and a controller 200.

The sensing device 100 may monitor a wireless frame that is transmitted/received between the plurality of stations and the access point, and may transmit frame analysis information obtained by analyzing the monitored wireless frame to the controller 200. The frame analysis information may include the MAC address of the station or AP which has transmitted the wireless frame, security settings, transfer rate, Service Set IDentifier (SSID), IEEE 802.11 a/b/g/n/ac/ax or the like, channel, Received Signal Strength Indication (RSSI), etc. The sensing device 100 may execute a blocking command for the AP or the station based on blocking command information received from the controller 200.

In an embodiment, the sensing device 100 may include a sensing module 110 and a communication module 120.

The sensing module 110 may generate a blocking message based on the blocking command information received from the controller 200. The sensing module 110 may control the communication module 120 to send the generated blocking message to the target AP and the station. The communication module 120 may send the blocking message to the target AP and the station.

In an embodiment, the sensing module 110 may include a sensor receiver 111, a sensor analyzer 112, and a sensor blocker 113.

The sensor receiver 111 may monitor the wireless frame in a plurality of channels by controlling the communication module 120.

As a result of the monitoring, the sensor analyzer 112 may transmit the frame analysis information obtained by analyzing the received wireless frame to the controller 200. The frame analysis information may include information about the AP or the station which transmits the wireless frame.

The sensor blocker 113 may execute the blocking command. The sensor blocker 113 may generate a blocking message based on the blocking command information received from the controller 200.

For example, the sensor blocker 113 may generate a blocking message including a deauthentication frame in a normal wireless network to which IEEE 802.11 is applied. The sensor blocker 113 may generate a blocking message including an interference signal and a spoofed packet in a secure wireless network to which IEEE 802.11w is applied.

The sensor blocker 113 may control the communication module 120 to send the generated blocking message to the AP and the station which transmit/receive the wireless frame. Here, the sensor blocker 113 may set an address at which the blocking message is to be sent to the BSSID of the AP, and may set an address at which the blocking message is to be received to the MAC address of the station. Alternatively, the sensor blocker 113 may set an address at which the blocking message is to be sent to the MAC address of the station, and may set an address at which the blocking message is to be received to the BSSID of the AP. The AP and the station, which receive the blocking message from the communication module 120, may determine that the opposite party has sent a blocking message indicative of association termination, and may then terminate mutual access therebetween.

The controller 200 may compare the frame analysis information received from the sensing device 100 with signature information stored in a database (DB), and may then determine whether the corresponding station or AP is unauthorized and is operating abnormally. Here, the signature information may include information such as previously collected wireless frame information, the blocking policy, or a blocking target list. When the corresponding station or AP is unauthorized or operating abnormally, the controller 200 may execute automatic blocking based on the blocking policy, or may allow the administrator to execute manual blocking by generating an alarm.

In an embodiment, the controller 200 may determine the AP or the station to be blocked based on the blocking policy and the frame analysis information.

The controller 200 may compare the MAC addresses of respective stations included in the manufacturer identification information and the frame analysis information with each other. The manufacturer identification information may include organizationally unique identifiers registered in IEEE. The controller 200 may determine a target station having a random MAC address and a station having a unique MAC address among the plurality of stations based on the result of the comparison.

In detail, the controller 200 may determine whether the MAC addresses of respective stations are random MAC addresses based on whether an upper 24-bit value included in each of the MAC addresses of the respective stations is included in organizationally unique identifiers. When the upper 24-bit value included in the MAC address of the corresponding station is included in the organizationally unique identifiers, the controller 200 may determine the MAC address of the corresponding station to be a unique MAC address. When the upper 24-bit value is different from those of the organizationally unique identifiers, the sensing module 110 may determine the MAC address of the corresponding station to be a random MAC address.

The blocking policy may be set variously depending on a wireless network environment.

In an embodiment, the blocking policy may be a policy which blocks access to the access point by the target station having a random MAC address and which allows access to the access point by a station having a unique MAC address among the plurality of stations. The reason for this is to prevent intrusion into the wireless network by blocking access by a station having a random MAC address by which a user cannot be specified.

In an embodiment, the blocking policy may be a policy which blocks access to the access point by a target station having a random MAC address, and which blocks access to the access point by a station having a non-registered MAC address and allows access to the access point by a station having a registered MAC address, among stations having unique MAC addresses. The reason for this is to allow access only by an access-authorized station among stations having unique MAC addresses by which users can be specified, thus preventing intrusion into the wireless network. The registered MAC address may be the MAC address of a station pre-registered by an administrator.

In an embodiment, the blocking policy may be a policy which blocks access to the access point by a station unapproved by the administrator and which allows access to the access point by a station approved by the administrator, among target stations having random MAC addresses. This is intended to exceptionally allow access in the case where previous approval is acquired from the administrator even though a station has a random MAC address by which a user cannot be specified.

The controller 200 may generate blocking command information, and may transmit the generated blocking command information to the sensing device 100. The blocking command information may include information about an AP or a station determined to be blocked because the AP or the station is included in the blocking target list or violates the blocking policy.

In an embodiment, the controller 200 may block access by the AP or the station using various schemes.

For example, the blocking schemes by the controller 200 may include AP blocking. In this case, when the BSSID of a blocking target AP is detected, the controller 200 may block all of stations that access the AP, rather than blocking a specific station.

In another example, the blocking schemes by the controller 200 may include station blocking. Here, when a corresponding station is determined to be an unauthorized station or it is detected that the corresponding station is masquerading as an authorized station, the controller 200 may block the corresponding station. When the MAC address of the corresponding station appears, the controller 200 may block access to all APs.

In a further example, the blocking schemes by the controller 200 may include specific AP-station blocking. Here, when an authorized station is associated with an unauthorized AP or when an unauthorized station is associated with an authorized AP, the controller 200 may block the association. When the corresponding station MAC appears, the controller 200 may block access only to a designated AP, but may not be involved in access to other APs.

Figure 2:
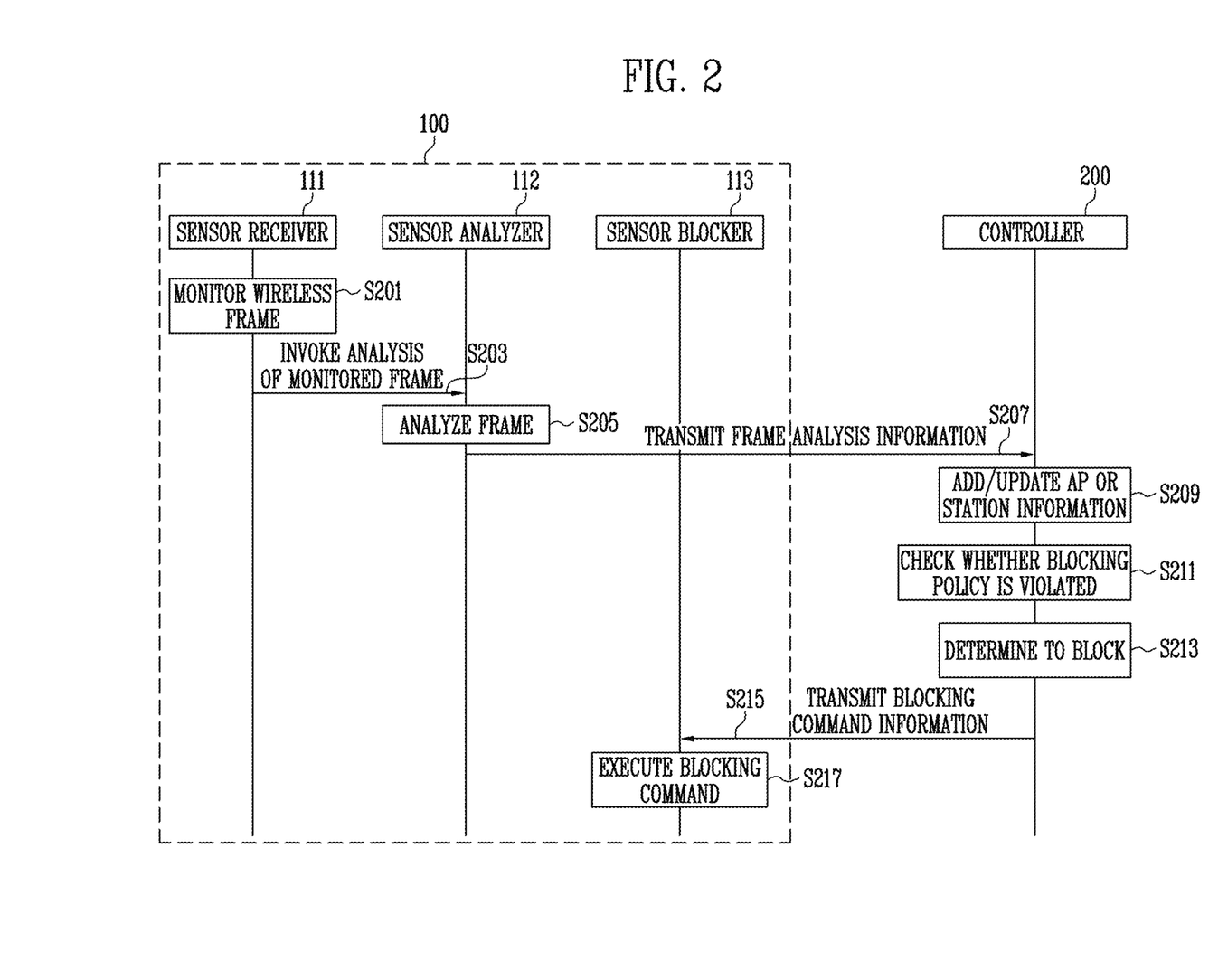
FIG. 2 is a flowchart illustrating an access blocking method by a wireless intrusion prevention system.

FIG. 2 is a flowchart illustrating an access blocking method by a wireless intrusion prevention system.

Referring to FIG. 2, at step S201, the sensor receiver 111 may monitor a wireless frame that is transmitted/received between an AP and a plurality of stations through a plurality of channels.

At step S203, the sensor receiver 111 may invoke analysis of the received wireless frame to the sensor analyzer 112.

At step S205, the sensor analyzer 112 may analyze the wireless frame, and may generate frame analysis information. The frame analysis information may include the MAC address of the station or AP which has transmitted the wireless frame, security Service Set IDentifier (SSID), IEEE settings, transfer rate, 802.11 a/b/g/n/ac/ax or the like, channel, Received Signal Strength Indication (RSSI), etc.

At step S207, the sensor analyzer 112 may provide the frame analysis information to the controller 200.

At step S209, the controller 200 may add or update information about the AP or station that has transmitted the wireless frame based on the frame analysis information.

At step S211, the controller 200 may determine, based on a blocking policy, whether the corresponding AP or station has violated the blocking policy.

At step S213, when it is determined that the corresponding AP or station has violated the blocking policy, the controller 200 may generate blocking command information depending on the policy setting value.

At step S215, the controller 200 may transmit the blocking command information to the sensor blocker 113. The blocking command information may include information about an AP or a station determined to be blocked because the AP or the station is included in the blocking target list or violates the blocking policy.

At step S217, the sensor blocker 113 may execute a blocking command based on the received blocking command information. In detail, the sensor blocker 113 may generate a blocking message based on the blocking command information. The sensor blocker 113 may control the communication module to transmit the blocking message to the target AP or station. The blocking message may include the above-described deauthentication frame, interference signal or spoofed packet.

Figure 3:
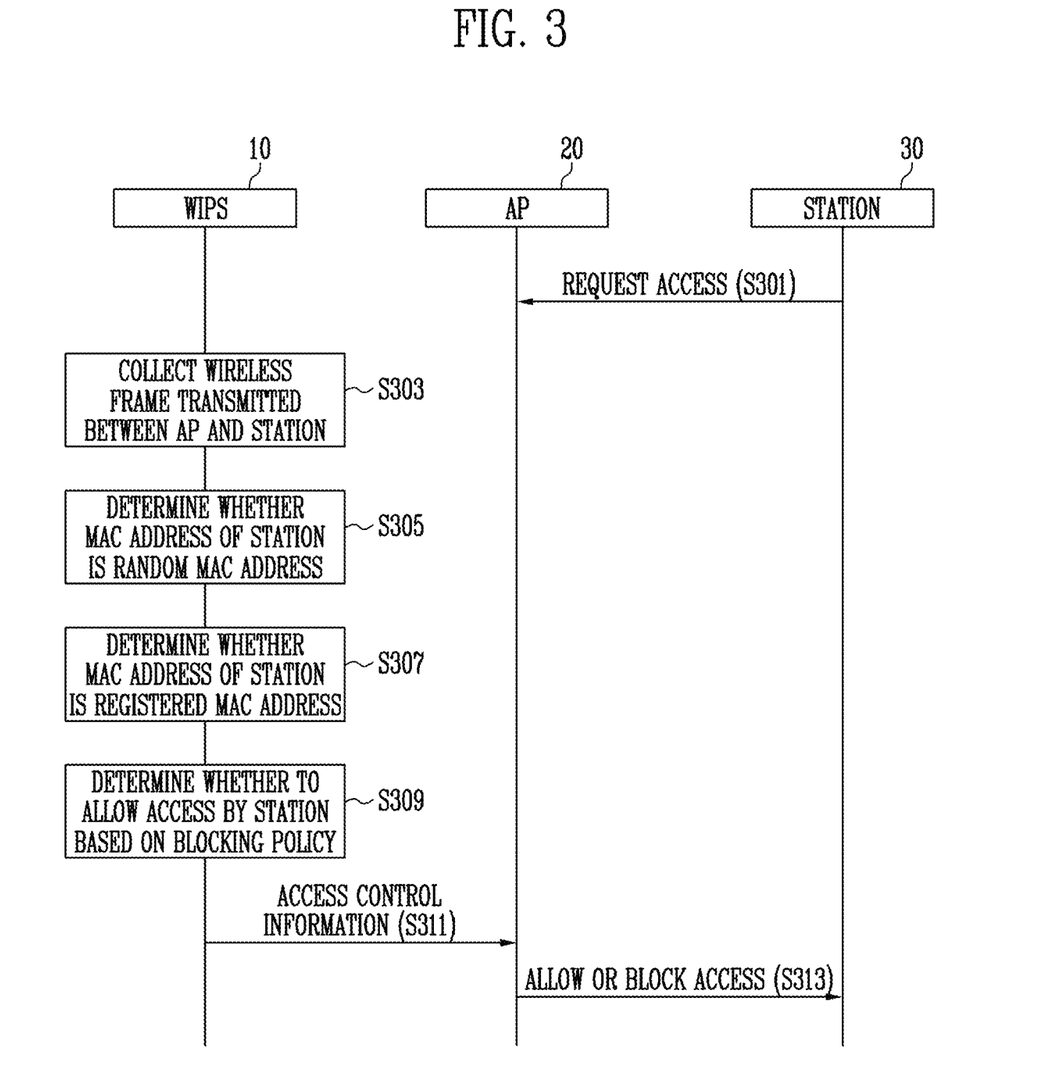
FIG. 3 is a diagram for explaining the control of access by a station in a wireless intrusion prevention system according to an embodiment.

FIG. 3 is a diagram for explaining the control of access by a station in a wireless intrusion prevention system according to an embodiment.

Referring to FIG. 3, at step S301, the station 30 may transmit a wireless frame including an access request to the AP 20.

At step S303, the WIPS 10 may collect a wireless frame transmitted between the AP 20 and the station 30.

At step S305, the WIPS 10 may determine whether the MAC address of the station 30 included in the collected wireless frame is a random MAC address.

For example, when an upper 24-bit value included in the MAC address of the station 30 is included in an organizationally unique identifier, the WIPS 10 may determine the MAC address of the station 30 to be a unique MAC address, whereas when the upper 24-bit value is different from that of the organizationally unique identifier, the WIPS 10 may determine the MAC address of the station 30 to be a random MAC address. The WIPS 10 may obtain manufacturer identification information including organizationally unique identifiers from IEEE.

At step S307, the WIPS 10 may determine whether the MAC address of the station 30 is registered MAC address. The registered MAC address may be the MAC address of the station by which access to the access point is previously allowed by the administrator. In another embodiment, step S307 may be skipped.

At step S309, the WIPS 10 may determine, based on a blocking policy, whether access by the station 30 to the AP 20 is to be allowed.

In an embodiment, the blocking policy may be a policy which blocks access to the access point by the target station having a random MAC address and which allows access to the access point by a station having a unique MAC address among the plurality of stations. The reason for this is to prevent intrusion into the wireless network by blocking access by a station having a random MAC address by which a user cannot be specified.

In an embodiment, the blocking policy may be a policy which blocks access to the access point by a target station having a random MAC address, and which blocks access to the access point by a station having a non-registered MAC address and allows access to the access point by a station having a registered MAC address, among stations having unique MAC addresses. The reason for this is to allow access only by an access-authorized station among stations having unique MAC addresses by which users can be specified, thus preventing intrusion into the wireless network. The registered MAC address may be the MAC address of a station pre-registered by an administrator.

In an embodiment, the blocking policy may be a policy which blocks access to the access point by a station unapproved by the administrator and which allows access to the access point by a station approved by the administrator, among target stations having random MAC addresses. This is intended to exceptionally allow access in the case where approval is acquired from the administrator even though a station has a random MAC address by which a user cannot be specified.

At step S311, the WIPS 10 may provide access control information, indicating whether access by the station 30 to the AP 20 is to be allowed, to the AP 20.

At step S313, the AP 20 may allow or block access by the station 30 based on the access control information.

Figure 4:
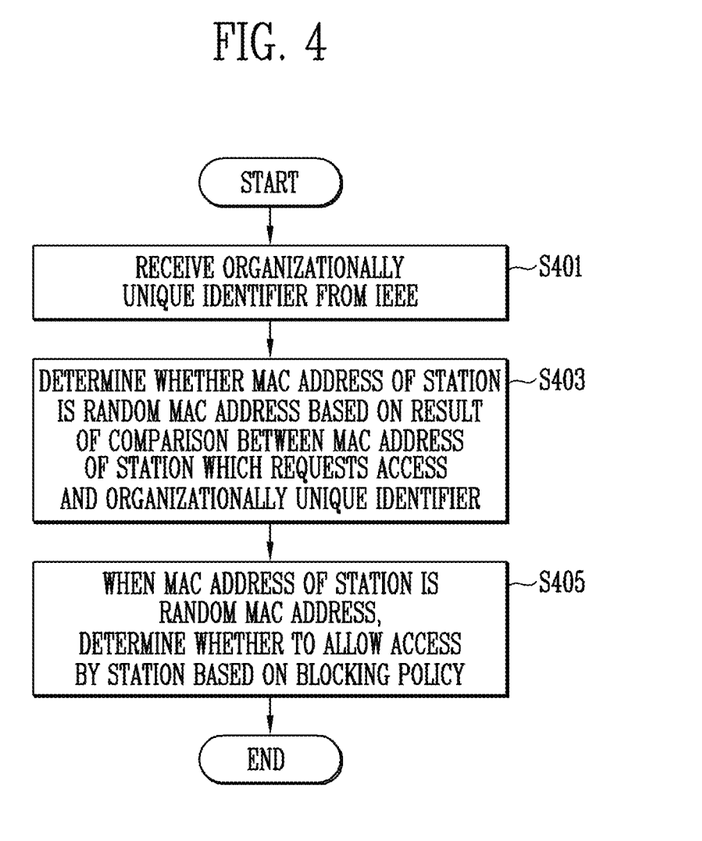
FIG. 4 is a flowchart illustrating the operation of a wireless intrusion prevention system according to an embodiment.

FIG. 4 is a flowchart illustrating the operation of a wireless intrusion prevention system according to an embodiment.

Referring to FIG. 4, at step S401, the wireless intrusion prevention system may receive an Organizationally Unique Identifier (OUI) from Institute of Electrical and Electronics Engineers (IEEE).

At step S403, the wireless intrusion prevention system may determine whether the MAC address of a station is a random MAC address, based on the result of a comparison between the MAC address of a station which requests access to an access point and the organizationally unique identifier.

At step S405, when the MAC address of the station is a random MAC address, the wireless intrusion prevention system may determine whether to allow access by the station based on the blocking policy.

Figure 5:
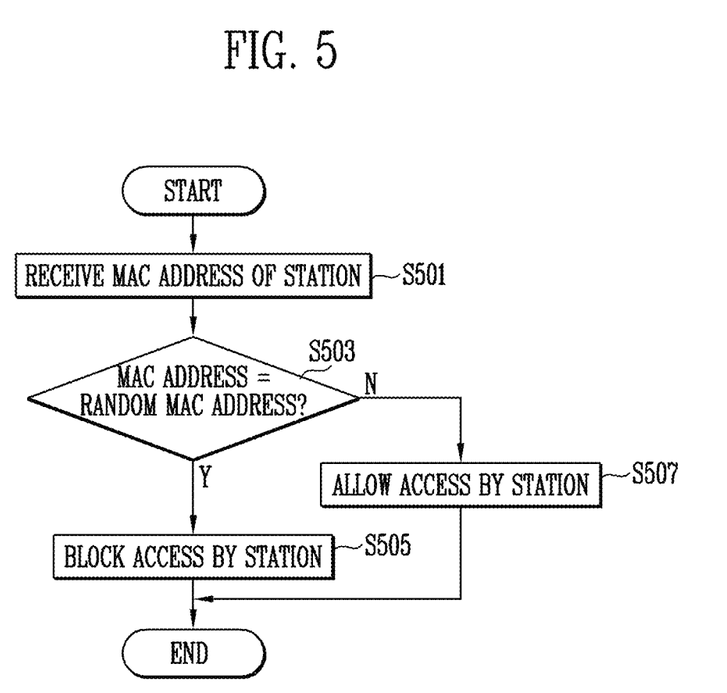
FIG. 5 is a flowchart illustrating the operation of a wireless intrusion prevention system according to an embodiment.

FIG. 5 is a flowchart illustrating the operation of the wireless intrusion prevention system according to an embodiment.

Referring to FIG. 5, at step S501, the wireless intrusion prevention system may receive a wireless frame including the MAC address of a station which requests access from the station.

At step S503, the wireless intrusion prevention system may determine whether the MAC address of the station is a random MAC address. For example, when the MAC address of the station is identical to an organizationally unique identifier, the wireless intrusion prevention system may determine the MAC address of the station to be a unique MAC address, whereas when the MAC address of the station is different from the organizationally unique identifier, the wireless intrusion prevention system may determine the MAC address of the station to be a random MAC address.

When, as a result of the determination, the MAC address of the station is the random MAC address, the wireless intrusion prevention system may proceed to step S505, whereas when, as a result of the determination, the MAC address of the station is the unique MAC address, the wireless intrusion prevention system may proceed to step S507.

At step S505, the wireless intrusion prevention system may block access to the access point by the station having the random MAC address.

At step S507, the wireless intrusion prevention system may allow access to the access point by the station having the unique MAC address.

According to the embodiment of FIG. 5, access to the access point by a target station having a random MAC address may be blocked, and access to the access point by a station having a unique MAC address among the plurality of stations may be allowed. The reason for this is to prevent intrusion into the wireless network by blocking access by a station having a random MAC address by which a user cannot be specified.

Figure 6:
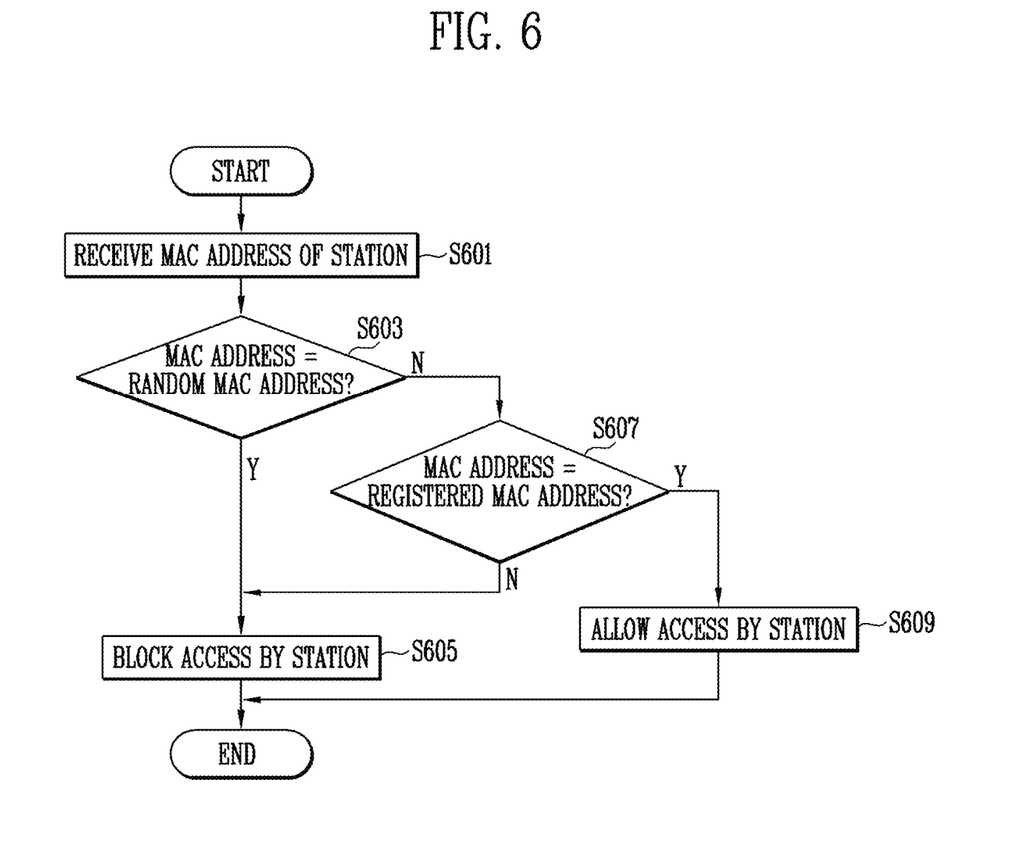
FIG. 6 is a flowchart illustrating the operation of a wireless intrusion prevention system according to an embodiment.

FIG. 6 is a flowchart illustrating the operation of the wireless intrusion prevention system according to an embodiment.

Referring to FIG. 6, at step S601, the wireless intrusion prevention system may receive a wireless frame including the MAC address of a station which requests access from the station.

At step S603, the wireless intrusion prevention system may determine whether the MAC address of the station is a random MAC address.

When, as a result of the determination, the MAC address of the station is the random MAC address, the wireless intrusion prevention system may proceed to step S605, whereas when, as a result of the determination, the MAC address of the station is a unique MAC address, the wireless intrusion prevention system may proceed to step S607. A wireless frame including a MAC address may be received.

At step S605, the wireless intrusion prevention system may block access to the access point by the station having the random MAC address.

At step S607, the wireless intrusion prevention system may determine whether the MAC address of the station is a registered MAC address. When, as a result of the determination, the MAC address of the station is the registered MAC address, the process may proceed to step S609, whereas when, as a result of the determination, the MAC address of the station is a non-registered MAC address, the process may proceed to step S605. The registered MAC address may be the MAC address of the station by which access to the access point is previously allowed by the administrator.

At step S609, the wireless intrusion prevention system may allow access to the access point by the station having the registered MAC address.

According to the embodiment of FIG. 6, access to the access point by the target station having a random MAC address may be blocked. Access to the access point by the station having a non-registered MAC address among stations having unique MAC addresses may be blocked, and access to the access point by the station having a registered MAC address may be allowed. The reason for this is to allow access only by a station, which is access-allowed by an administrator, among the stations having unique MAC addresses, thus preventing intrusion into the wireless network.

Figure 7:
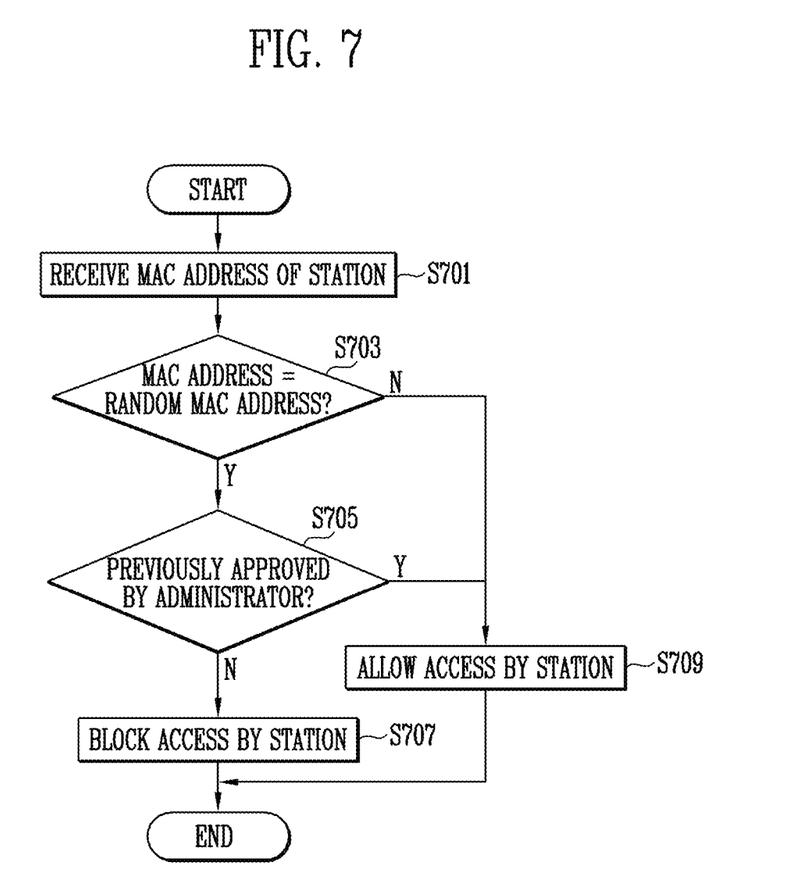
FIG. 7 is a flowchart illustrating the operation of a wireless intrusion prevention system according to an embodiment.

FIG. 7 is a flowchart illustrating the operation of the wireless intrusion prevention system according to an embodiment.

Referring to FIG. 7, at step S701, the wireless intrusion prevention system may receive a wireless frame including the MAC address of a station which requests access to an access point from the station.

At step S703, the wireless intrusion prevention system may determine whether the MAC address of the station is a random MAC address. When, as a result of the determination, the MAC address of the station is the random MAC address, the wireless intrusion prevention system may proceed to step S705, whereas when, as a result of the determination, the MAC address of the station is a unique MAC address, the wireless intrusion prevention system may proceed to step S709.

At step S705, the wireless intrusion prevention system may determine, based on a blocking policy, whether the corresponding station is a station previously approved by an administrator. When the station is the previously approved station, the wireless intrusion prevention system may proceed to step S709, whereas when the station is not a previously approved station, the wireless intrusion prevention system may proceed to step S707.

At step S707, the wireless intrusion prevention system may block access to the access point by the station which is not previously approved by the administrator among stations having random MAC addresses.

At step S709, the wireless intrusion prevention system may allow access to the access point by the station which has a unique MAC address, or by the station previously approved by the administrator among the stations having random MAC addresses.

According to the embodiment of FIG. 7, access to the access point by the station unapproved by the administrator among target stations having random MAC addresses may be blocked, and access to the access point by the station previously approved by the administrator may be allowed. The reason for this is to exceptionally allow access in the case where previous approval is acquired from the administrator even though a station has a random MAC address by which a user cannot be specified.

The invention claimed is:

1. A wireless intrusion prevention system, comprising:
a sensing device configured to monitor a wireless frame transmitted/received between an access point (AP) and a plurality of stations over a wireless network and generate frame analysis information based on the wireless frame, wherein the frame analysis information generated by the sensing device includes at least Media Access Control (MAC) addresses for respective stations in the wireless network; and
a controller configured to
compare manufacturer identification information including Organizationally Unique Identifiers (OUIs) with the MAC addresses of the respective stations included in the frame analysis information, determine a target station having a random MAC address and an access-authorized station having a unique MAC address registered by an administrator by which a user is specified among the plurality of stations based on a result of the comparison,
block access to the access point by the target station having for the random MAC address a non-registered MAC address by which the user is not specified, and
allow access to the access point by the access-authorized station having the unique MAC address which the administrator has approved and registered and by which the user is specified.

2. The wireless intrusion prevention system according to claim 1, wherein the controller is configured to obtain the manufacturer identification information from Institute of Electrical and Electronics Engineers (IEEE).

3. The intrusion prevention system according to claim 1, wherein the controller is configured to determine whether the MAC addresses of respective stations are random MAC addresses based on whether an upper 24-bit value included in each of the MAC addresses of the respective stations is included in the organizationally unique identifiers.

4. The intrusion prevention system according to claim 3, wherein the controller is configured to, when the upper 24-bit value included in each of the MAC addresses of the stations is included in the organizationally unique identifiers, determine the MAC address of the corresponding station to be a unique MAC address, and when the upper 24-bit value is different from those of the organizationally unique identifiers, determine the MAC address of the corresponding station to be a random MAC address.

5. The wireless intrusion prevention system according to claim 1, wherein the controller is configured to allow access to the access point by the station having the unique MAC address depending on whether the unique MAC address is a registered MAC address that is pre-registered by the administrator.

6. The wireless intrusion prevention system according to claim 1, wherein the controller is configured to release blocking of access to the access point by another station previously approved by the administrator among target stations.

7. The wireless intrusion prevention system according to claim 1, wherein the wireless network includes a normal wireless network to which IEEE 802.11 is applied and a secure wireless network to which IEEE 802.11w is applied.

8. The wireless intrusion prevention system according to claim 1, wherein the frame analysis information includes at least one of a MAC address of each station that has transmitted/received the wireless frame, a Service Set IDentifier (SSID) of the access point, security settings, a transfer rate, version of IEEE 802.11, channel information, and Received Signal Strength Indication (RSSI).

9. A method of operating a Wireless Intrusion Prevention System (WIPS), the method comprising:
receiving a request to access an access point from a target station among a plurality of stations that transmit/receive a wireless frame to/from an access point over a wireless network;
determining whether a Media Access Control (MAC) address of the target station included in frame analysis information, provided to a controller of the WIPS from a sensing device monitoring wireless frames transmitted/received to/from the access point, is a random MAC address comprising a non-registered MAC address by which the user is not specified or a unique MAC address which is registered by an administrator by which a user is specified, based on a result of a comparison between manufacturer identification information including Organizationally Unique Identifiers (OUIs) and the MAC address of the target station; and
blocking access to the access point by the target station when the MAC address of the target station is the random MAC address by which the user is not specified, and allowing access to the access point by the target station when the MAC address of the target station is the unique MAC address which the administrator has approved and registered and by which the user is specified.

10. The method according to claim 9, wherein allowing access to the access point by the target station when the MAC address of the target station is the unique MAC address comprises:
allowing access to the access point by the target station depending on whether the unique MAC address is a registered MAC address that is pre-registered by the administrator.

11. The method according to claim 9, wherein blocking access to the access point by the target station when the MAC address of the target station is the random MAC address comprises:
releasing blocking of the access to the access point by the target station depending on whether the target station is previously approved by the administrator.

12. The method according to claim 9, further comprising:
obtaining the manufacturer identification information from Institute of Electrical and Electronics Engineers (IEEE).

13. The method according to claim 9, wherein determining whether the MAC address of the target station is the random MAC address or the unique MAC address comprises:
determining whether the MAC address of the target station is the random MAC address or the unique MAC address depending on whether an upper 24-bit value included in the MAC address of the target station is included in the organizationally unique identifiers.

14. The method according to claim 9, further comprising:
generating a blocking message for blocking access to the access point by the target station; and
sending the blocking message including a deauthentication frame or including an interference signal and a spoofed packet to the target station.

15. The method according to claim 9, wherein the wireless network includes a normal wireless network to which IEEE 802.11 is applied and a secure wireless network to which IEEE 802.11w is applied.

* * * * *